United States Patent [19]

Hu et al.

[11] Patent Number: 5,805,395
[45] Date of Patent: Sep. 8, 1998

[54] HALF-CYCLE SUMMATION V/HZ RELAY FOR GENERATOR AND TRANSFORMER OVER-EXCITATION PROTECTION

[75] Inventors: Yi Hu, Cary; David Hart, Raleigh; Damir Novosel; Robert Smith, both of Cary, all of N.C.

[73] Assignee: ABB Power T&D Company Inc., Raleigh, N.C.

[21] Appl. No.: 766,715

[22] Filed: Dec. 13, 1996

[51] Int. Cl.$^6$ .................................................. H02H 7/06
[52] U.S. Cl. .............................................. 361/21; 361/88
[58] Field of Search ................................ 361/18, 20, 21, 361/23, 28, 29, 30, 33, 51, 52, 54, 56, 78, 86, 88, 93

[56] References Cited

U.S. PATENT DOCUMENTS

| | | | |
|---|---|---|---|
| 4,539,618 | 9/1985 | Stich | 361/94 |
| 4,639,817 | 1/1987 | Cooper et al. | 361/62 |
| 4,694,374 | 9/1987 | Verbanets, Jr. | 361/96 |
| 4,722,059 | 1/1988 | Engel et al. | 364/483 |
| 4,725,914 | 2/1988 | Garitty | 361/76 |
| 4,939,617 | 7/1990 | Hoffman et al. | 361/64 |
| 5,224,011 | 6/1993 | Yalla et al. | 361/93 |
| 5,315,527 | 5/1994 | Beckwith | 364/483 |

OTHER PUBLICATIONS

Pettigrew, et al., "Operating and Application Experience with a Microprocessor–Based Volts Per Hertz Relay," Fortieth Annual Conference for Protective Relay Engineers, Apr. 13–15, 1987, pp. 1–27.

Gabriel Benmouyal, "An Adaptive Sampling–Interval Generator For Digital Relaying," IEEE Transactions on Power Delivery, vol. 4, No. 3, Jul. 1989, pp. 1602–1609.

*Primary Examiner*—Ronald W. Leja
*Attorney, Agent, or Firm*—Woodcock Washburn Kurtz Mackiewicz & Norris LLP

[57] ABSTRACT

A system for implementing accurate V/Hz value measurement and trip time determination for generator/transformer overexcitation protection independent of the conventional frequency tracking and phasor estimation based on Discrete Fourier Transformation (DFT) techniques. The half-cycle summation technique of the invention is a non-recursive digital technique which measures the per unit V/Hz value by summing the sampled data points in every half cycle of a sinusoidal input signal and dividing the sum with the ideal base sum value. When the input voltage signal is sampled at a reasonable frequency, the technique of the invention approximates the accurate per unit V/Hz value of the input voltage signal and thus obtains an accurate V/Hz characteristic directly without computing voltage and frequency separately.

16 Claims, 9 Drawing Sheets

PRIOR ART
*Fig. 1*

———: IDEAL (|A|/ω)

- - - - : ACTUAL (|A|sqrt(ω^2+p^2))

(a) FREQUENCY RESPONSE

PRIOR ART
*Fig. 2A*

(b) ENLARGED FREQUENCY RESPONSE CURVE AT LOW FREQUENCY END

*Fig. 2b* PRIOR ART (c) RELATIVE ERRORS BETWEEN THE IDEAL AND THE ACTUAL

5(b) PROTECTION FUNCTION SUBROUTINE

*Fig. 5(b)*

5(a) MAIN PROGRAM

HALF-CYCLE SUMMATION V/HZ RELAY FOR GENERATOR AND TRANSFORMER OVER-EXCITATION PROTECTION

BACKGROUND OF THE INVENTION

1. Field of the Invention

The present invention relates to a technique for protecting generators and transformers from the damage caused by over-excitation by processing the sampled voltage signal to detect those conditions requiring control, alarm, and shut down of the generator or transformer. In particular, a half-cycle summation technique is used to provide accurate V/Hz value measurement and trip time determinations in the required V/Hz relay operating frequency range which is independent of the sampling frequency and independent of other processing techniques, such as the Discrete Fourier Transform (DFT) technique, conventionally used in a digital relay protection system.

2. Description of the Prior Art

V/Hz relaying is conventionally used to protect generators and transformers from the damage caused by overexcitation, where the ratio of V/Hz is used as the measure of the generator's or transformer's over-excitation. As known to those skilled in the art, the excitation level of a generator or a transformer can be accurately measured by the ratio of the voltage magnitude over the frequency of a voltage impressed on them, thus the name V/Hz protection. Typically, the generator and transformer V/Hz protection function is required to work across the wide frequency range (5–80 Hz) which is experienced by a generator or a generator-transformer unit. Generally, a high V/Hz condition may occur during the start up or shut down of a generator when the speed of the generator is low and during a sudden load rejection or as a result of a certain system disturbance when the voltage suddenly becomes high while the frequency is only changed slightly or is not changed.

Figure 1:
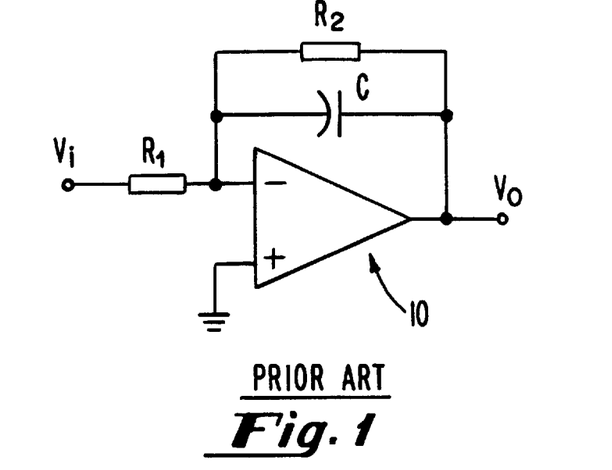
FIG. 1 illustrates a conventional analog integrator circuit.

Conventional analog integrator type V/Hz relays (solid-state) can provide sufficient overexcitation protection in the desired frequency range with high accuracy. The analog integrator can be viewed as a special type of low-pass filter with a frequency response characteristic that is inversely proportional to the input signal's frequency. As shown in FIG. 1, the basic circuit of an analog V/Hz relay is an analog integrator 10. Those skilled in the art will appreciate that the analog integrator 10 shown in FIG. 1 is not an ideal integrator, but that it becomes an ideal integrator if $R_2$ is infinite. This characteristic causes the integrator 10 to become unstable. However, by carefully selecting the values of the $R_1$, $R_2$ and C, the integrator 10 can approach the ideal integrator and still remain stable.

The transfer function of the analog integrator 10 of FIG. 1 is $H(s)=A/(s-p)$, where $A=-1/R_1 C$ and $p=-1/R_2 C$, and the frequency response of the integrator transfer function is obtained by substituting "s" with "$j\omega$", i.e.:

$$H(\omega) = H(s=j\omega) = \frac{A}{j\omega - p} \quad \text{Equation (1)}$$

and $$|H(\omega)| = \frac{|A|}{\sqrt{\omega^2 + p^2}} \approx \frac{|A|}{\omega} \text{ when } \omega \gg p \quad \text{Equation (2)}$$

Equation (2) shows that the magnitude of the output signal $V_o$ from analog integrator 10 is proportional to the magnitude of the input signal $V_i$ and inversely proportional to the frequency of the input signal, if $\omega \gg p$. For a practical circuit with $R_1=150$ k$\Omega$, $R_2=1$ M$\Omega$, and $C=0.1$ $\mu$F, its parameters are: $A=-66.7$ and $p=-10$. The actual $|H(\omega)|$ and ideal ($|A|/\omega$) frequency response curves are plotted in FIGS. 2A and 2B and the relative error of $|H(\omega)|$ is plotted in FIG. 2C, where the relative error of $|H(\omega)|$ is defined as:

$$\text{error } (\%) = \left| \frac{\frac{A}{\sqrt{\omega^2 + p^2}} - \frac{A}{\omega}}{\frac{A}{\omega}} \right| \times 100\% = \quad \text{Equation (3)}$$

$$\left| \frac{\omega}{\sqrt{\omega^2 + p^2}} - 1 \right| \times 100\%$$

Figure 2A:
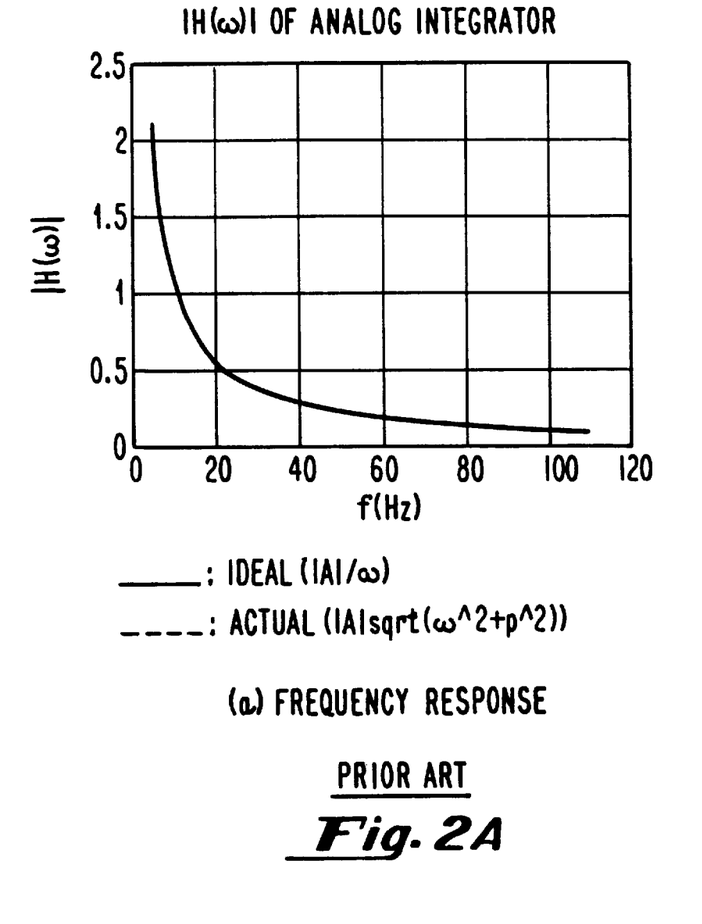
FIGS. 2A and 2B together illustrate a comparison of the frequency response curves between an ideal and an actual analog integrator circuit of the type illustrated in FIG. 1.
Figure 2B:
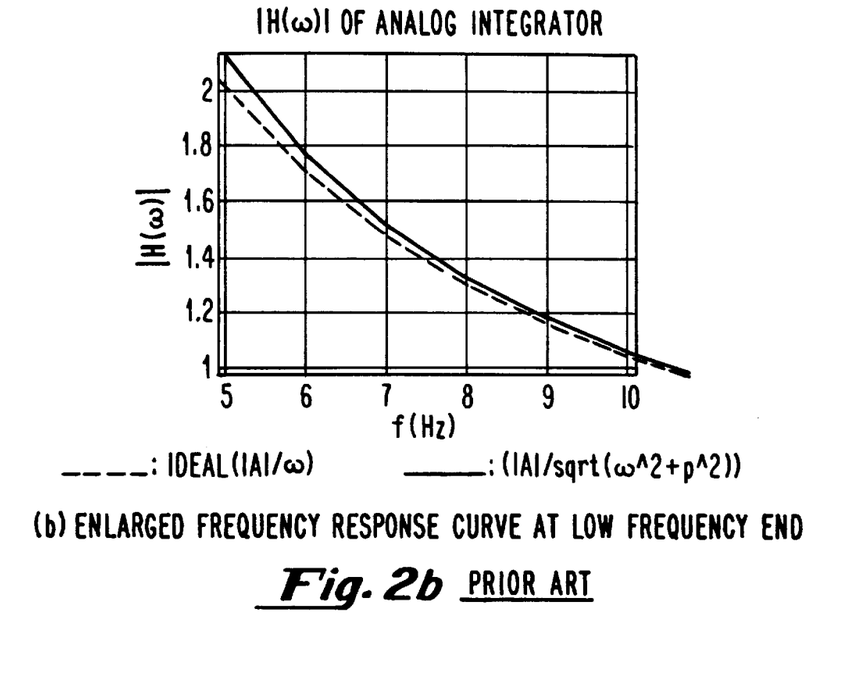
Figure 2C:
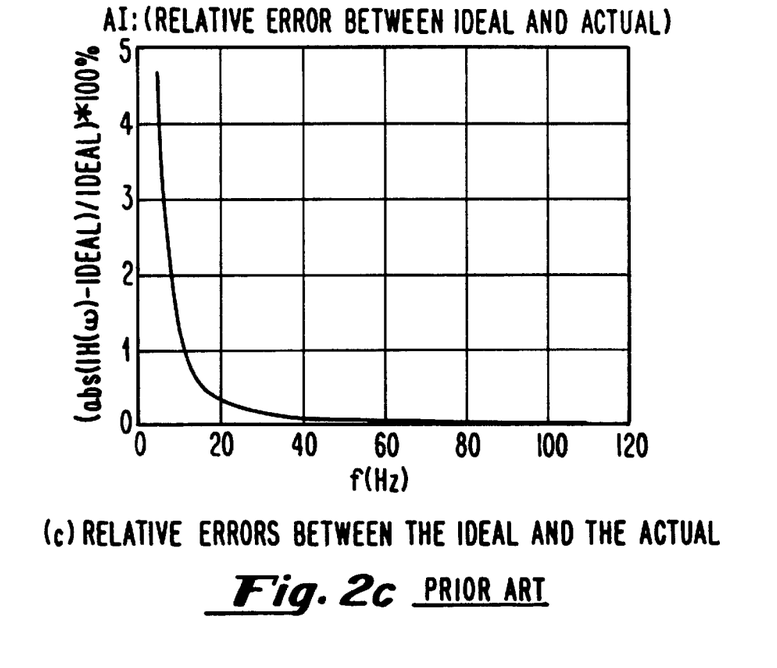
FIG. 2C illustrates the relative error between an actual integrator circuit and an ideal analog integrator circuit of the type illustrated in FIG. 1.

As FIGS. 2A–2C show, $|H(\omega)|$ and ideal ($|A|/\omega$) are very close to each other. Thus, the analog integrator 10 can be used for V/Hz protection across a wide frequency range. In fact, the analog integrator 10 of FIG. 1 could work down to very low frequencies and still maintain an acceptable accuracy (relative error <0.5% from 20 Hz and up and relative error <4% from 5 Hz and up, for the above example). Such an integrator is always stable provided the real part of "p" is less than zero, which is the case in the above example.

From the above error equation, the smaller the value of $|p|$ is, the smaller the relative error between $|H(\omega)|$ of the above analog integrator and the ideal ($|A|/\omega$) is. However, since the transient response time constant of the circuit is $T_d=|1/p|$, the parameter p also determines the time delay of the circuit in response to a sudden change of the input signal. In the above example, the time constant is $T_d=\frac{1}{10}=0.1$ second, which is small. Thus, the parameter p could be chosen, such as in the above example, to obtain an $|H(\omega)|$ characteristic which is close to the ideal ($|A|/\omega$) without introducing excessive transient response time delay.

Those skilled in the art will also appreciate that the analog V/Hz relay uses a peak-detection circuit to determine the peak value of the output signal of the analog integrator, which is representative of the V/Hz value, to implement the inverse time delay characteristic, or a level detect circuit when a fixed time delay characteristic is used.

Digital V/Hz relay protection systems are generally known. For example, a prior art digital programmed over-excitation protective relay is described in U.S. Pat. No. 4,694,374 to Verbanets, Jr. The relay described by Verbanets, Jr. generates a first signal representative of the V/Hz value by integrating samples of a full cycle rectified voltage signal over a half cycle between two zero crossings using the trapezoidal or parabolic method or both. The first signal is then averaged over a predetermined period to generate a second signal, which is used to derive the time-to-trip for inverse time trip operation of the relay according to the disclosed method. The voltage signal used to compute the first signal is sampled at a predetermined fixed sampling frequency. Full cycle rectification circuits, zero-crossing detectors, and other special hardware are used to assist in the relay operation. The integration process of the half cycle sampled data is different depending on whether an even or odd number of samples is contained in the half cycle. A clean up procedure is applied to correct the error caused by the partial interval integration at the first and the last interval of a half cycle. Thus, in this relay, the first signal is a discrete signal which is output once in a half cycle, while the second signal is also a discrete signal which is output once in a predetermined period. However, the requirement of additional special hardware makes this type of V/Hz relay system less desirable.

The Discrete Fourier Transform (DFT) technique is conventionally used in digital protection systems to compute phasors of the input voltage and current signals for use by different protection functions. To obtain an accurate DFT computation result, the samples used in the DFT computation must be taken from one fundamental cycle of the signal and be evenly spaced. If such sampling conditions are not met, the computed DFT phasors will be in error due to the well known spectrum leakage and picket fencing problems. In an integrated (multi-function) generator protection system using a DFT algorithm, the fundamental frequency of the voltage and current signals is not fixed but varies. As a result, the following techniques have to be used to compute the phasors correctly: (1) the sampling frequency is varied to keep a fixed number of samples per cycle which is equal to the fixed number of data points used in the DFT computation; or (2) the sampling is conducted at a fixed frequency but the DFT window length is varied to keep the number of data points used in the DFT computation equal to the number of samples in one cycle. In the varying sampling frequency approach, the frequency of the input voltage, which is used to dynamically change the sampling frequency, is obtained as the result of frequency tracking. In the varying DFT window approach, on the other hand, the frequency of the input voltage, which is used to change the DFT window length, is obtained as the result of frequency estimation using the DFT phasor angle difference.

The computation of the V/Hz value in an integrated digital generator protection system using the above-mentioned DFT-based techniques appears to be relatively straightforward, since on its face all that is required is dividing the measured voltage by the measured frequency. However, this approach cannot provide an accurate V/Hz measurement in the desired operating frequency range of a V/Hz relay, for as the frequency approaches zero, the above-mentioned techniques are not suitable due to aliasing (the need of a very low cutoff frequency filter), the response time (the need to wait for one cycle of data to become available), and other problems. If the anti-aliasing is not performed properly, errors will occur in the phasor computation according to the well-known Nyquist Theorem. To avoid such aliasing problems, the sampling frequency must be fixed at the value corresponding to the low frequency limit of the varying sampling frequency approach when the actual frequency is below that limit, or the DFT window length must be fixed at the length corresponding to the low frequency limit in the varying DFT window length approach when the actual frequency is below the limit. Unfortunately, even with such anti-aliasing measures applied, the phasor computation and the frequency estimation still contain errors for the DFT techniques when the actual frequency is below the low frequency limit established by the Nyquist Theorem, for the DFT is no longer performed on samples in a single cycle. Consequently, the V/Hz value computed using the voltage phasor and the estimated frequency is inaccurate when the actual frequency is below the low frequency limit, which may occur during a generator's start-up and shut-down process when its speed is low.

Unlike the V/Hz relay, most of the generator protection functions are only required to operate when a generator is running around its nominal speed. The operating frequency range provided by the varying DFT window length approach is thus sufficient for the correct operation of these protection functions. It would be advantageous for an integrated generator protection system to use DFT techniques for these functions while using other techniques to perform a more accurate V/Hz protection function and other protection functions which are required to operate in a much wider frequency range so that overall better system performance can be achieved. As will be described in detail below, the present invention has been designed to address this problem by directly computing an accurate V/Hz ratio using half-cycle summation of the sampled input voltage signal so that the results are similar or improved in comparison with the prior art analog circuit of FIG. 1.

Techniques of providing half-cycle digitization of AC signals using an analog-to-digital converter are described in U.S. Pat. No. 5,315,527, where Beckwith discloses a technique of using either the positive or the negative half cycle for measurement. The device disclosed by Beckwith is powered by the potential of the opposite half-cycle of that used to sample the measured input signal. The sampled signals are then processed by starting a sum of the sample magnitudes squared when the first non-zero sample of the voltage signal from the analog-to-digital converter register occurs. All squared magnitudes of the non-zero samples are summed and the number of non-zero samples are counted using a programmed counter until a zero sample is received. The resultant sum of the non-zero squared samples is then divided by the number of non-zero samples since the last zero sample. The result is then converted to equivalent alternating current volts using appropriate algorithms, and the results are used to detect faults or other severe transient conditions. However, no direct measurement of transient conditions from the summation of a half-cycle of samples is taught by Beckwith. Moreover, those skilled in the art will appreciate that using only one half-cycle for measurement increases the response time to one cycle compared to the half-cycle response time for systems using both half-cycles for measurement, which is not desirable for generator protection.

Since the invention uses digital samples for the V/Hz trip determination, the invention is obviously different from an analog V/Hz relay using an analog integrator where both input and output signals are continuous signals. As will also be appreciated from the following detailed description, the invention further differs from the DFT based V/Hz relaying technique where the value of V/Hz is obtained by dividing the voltage magnitude by the frequency computed separately from the DFT and the frequency estimation technique in that the ratio of V/Hz of the sinusoidal input signal is obtained directly. In addition, the invention differs from the programmed overexcitation protective relay taught by Verbanets, Jr. since Verbanets, Jr. uses a non-recursive digital integration method supported by special hardware for the derivation of the V/Hz values by integrating samples of a full cycle rectified voltage signal over a half cycle between two zero crossings using trapezoidal or parabolic methods, or both. The half-cycle summation generator protection system of the invention does not require such additional hardware support for the V/Hz relay and the computation is much simpler than for the prior art digital integration technique. Instead, the invention uses the same voltage samples as used by the above-mentioned DFT techniques to perform V/Hz relaying in the desired operating frequency range and operates independently regardless of the sampling frequency approach being used in the system. Moreover, it is desired that both the positive and negative half cycles in the whole cycle be used for measurement, rather than a particular half-cycle as taught by Beckwith. The present invention has been designed to meet these needs.

SUMMARY OF THE INVENTION

A half-cycle summation type V/Hz relaying technique in accordance with the invention avoids the afore-mentioned problems with the prior art by directly obtaining the per unit ratio of V/Hz of a voltage signal from the summation of the voltage samples in one half cycle. The half-cycle summation technique of the invention is a non-recursive digital technique which measures the per unit V/Hz value by summing the sampled data points in every half cycle of a sinusoidal input signal and dividing the sum with a base ideal sum value at the rated voltage and frequency. When the input voltage signal is sampled at a reasonable frequency, the technique of the invention approximates the ideal per unit V/Hz value of the input voltage signal and obtains an accurate V/Hz characteristic directly without computing voltage and frequency separately. Because the technique of the invention is non-recursive, it has no stability problem and a shorter transient response time. When a fixed sampling frequency is used, the technique of the invention is also more accurate than other techniques at below nominal system frequency where high V/Hz conditions are more likely to occur.

In particular, the invention relates to a programmed protective relay system for protecting power equipment, supplied with energy from at least one power line, against overexcitation by generating an overexcitation relay signal and providing the relay signal to a circuit breaker which separates the power equipment from a source of the overexcitation. In a preferred embodiment, the system comprises voltage sensing means for sensing voltages of one or more power lines, frequency determining means for determining a frequency of the sensed voltage of the power lines, an analog to digital converter which samples the sensed voltage at a sampling frequency so as to form a digital voltage signal, summing means for summing the digital voltage signal over the half cycle of the sensed voltage signal and dividing the sum by a base ideal sum value at a rated voltage and frequency to obtain a value for a voltage/frequency ratio of the power lines, and means for generating the relay signal when the voltage/frequency ratio exceeds a predetermined value.

In accordance with a preferred embodiment of the invention, the digital Half-Cycle Summation (HCS) technique obtains the per unit ratio of V/Hz of a sinusoidal input signal directly as a sum of a half cycle of the absolute value of data samples of the sinusoidal input signal divided by a base ideal sum value, thereby avoiding the problems of the prior art. In particular, the digital HCS technique is based on the fact that the half cycle summation S of the absolute value of data samples of a sinusoidal signal $x = A \sin(2\pi f t)$ sampled at a frequency $f_{smp}$ approximates an ideal sum value $S_{ideal}$:

$$S = \sum_{n=1}^{N} |X_n| \approx \frac{f_{smp}}{\pi} \cdot \frac{A}{f} = S_{ideal}$$

where $X_n$ (n=1, ... N) are data samples in one half cycle of the digital voltage signal, A is an amplitude of the digital voltage signal, f is the frequency of the digital voltage signal, and $f_{smp}$ is the sampling frequency. The relative error of S (i.e., $|S-S_{ideal}|/S_{ideal}$) becomes smaller when $f_{smp}$ is higher. As can be seen from the above equation, the ideal half cycle summation value of a sinusoidal signal has a perfect V/Hz characteristic.

In accordance with the invention, the accurate per unit V/Hz value can be approximated by the above sum value S divided by the base ideal sum $S_{idealbase}$ at the rated voltage and frequency:

$$S_{idealbase} = \frac{f_{smp}}{\pi} \cdot \frac{A_{rated}}{f_{rated}}$$

which is very easy to perform in a digital system while not in an analog system. That is:

$$S_{pu} = \frac{S}{S_{idealbase}} \approx \frac{S_{ideal}}{S_{idealbase}} = \frac{A/f}{A_{rated}/f_{rated}}$$

where $A_{rated}$ is the rated voltage magnitude and $f_{rated}$ is the nominal frequency of the digital voltage signal. Thus, for a sufficiently high sampling frequency $f_{smp}$, this equation leads to the accurate per unit V/Hz value of a sinusoidal signal.

The above equation indicates that the higher the sampling frequency, the closer the digital HCS result is to the ideal V/Hz characteristic. Its error ($f_{smp}/f$) is mainly determined by the sampling frequency but also varies with the frequency of the input signal. The higher the sampling frequency, the lower the error; the higher the input signal's frequency, the higher the error. At a sampling frequency of 1920 Hz, the maximum relative errors across the desired frequency range (5–80 Hz) of a V/Hz relay has been found to be less than 0.6%.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings, of which.

DETAILED DESCRIPTION OF PRESENTLY PREFERRED EMBODIMENTS

A half-cycle summation type V/Hz relay with the above-mentioned beneficial features in accordance with a presently preferred exemplary embodiment of the invention will be described below with reference to FIGS. 3–6. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 3:
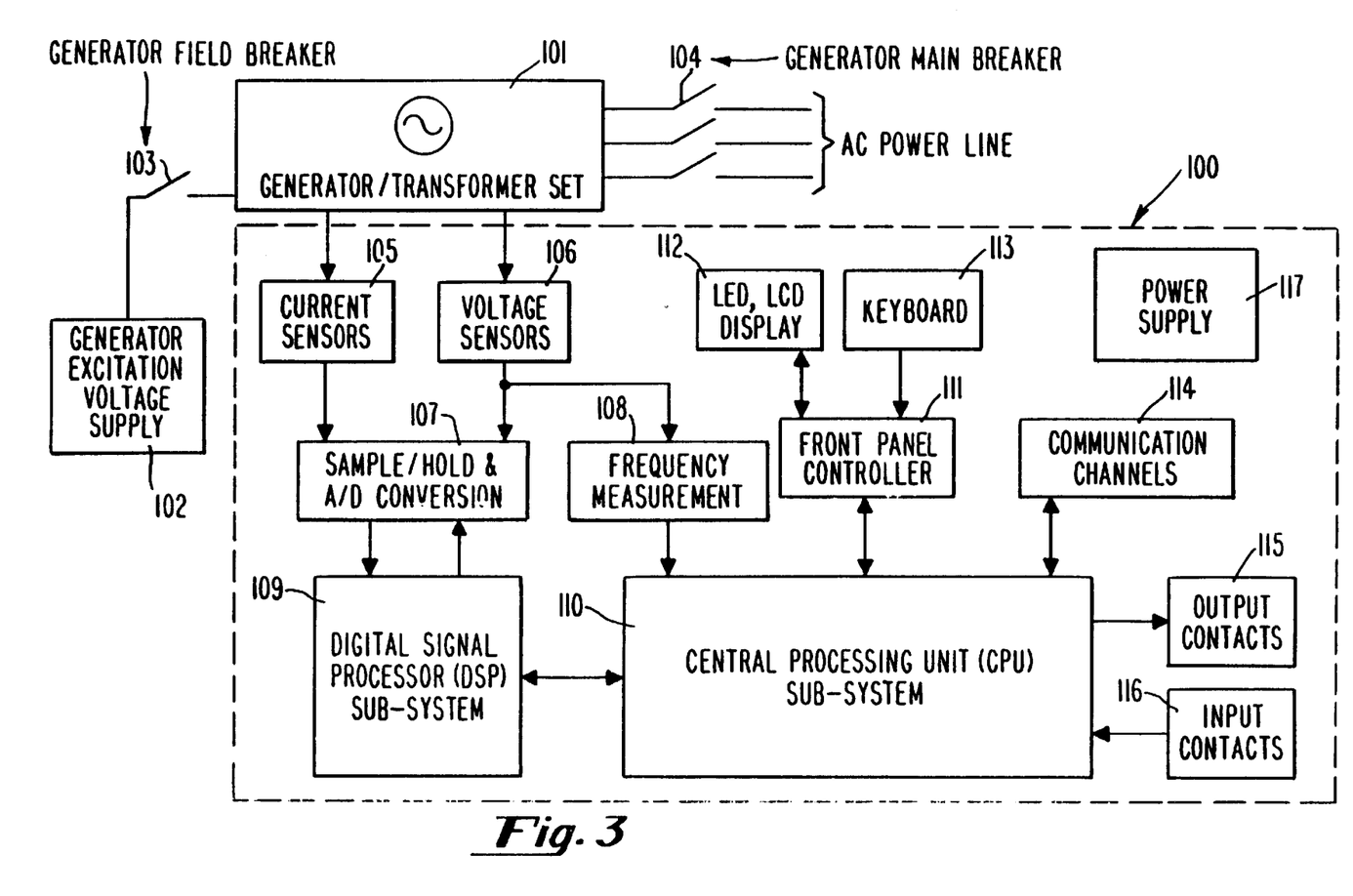
FIG. 3 illustrates a multi-function digital generator protection unit for measuring an overexcitation condition of a generator or transformer in accordance with the techniques of the invention.

As shown in FIG. 3, the present invention is preferably, though not necessarily, implemented in a system containing a multi-function digital generator protection unit (GPU) 100 which is designed to protect a generator/step-up transformer set 101 in accordance with the invention. As known by those skilled in the art, GPU 100 controls the main breaker 104 to connect and disconnect generator/transformer set 101 to/from the main AC system. GPU 100 may also control the field breaker 103 to connect and disconnect the generator excitation voltage supply 102 to the generator field winding of the generator/transformer set 101. In short, GPU 100 detects those conditions requiring control, alarm and shut down of an associated generator/transformer, and upon detection of an overexcitation condition of the associated generator, an instant or delayed trip of the generator field circuit breaker and/or main circuit breaker is initiated via external interfaces of GPU 100.

The GPU 100 functions by converting the three phase currents and voltages of the generator/transformer set 101 from the actual signals to appropriate current and voltage signals using current sensors 105 and voltage sensors 106, respectively. The output signals of current sensors 105 and voltage sensors 106 are then sampled at a predetermined sampling frequency (>=1920 Hz in a preferred embodiment, i.e., 32 samples/cycle at 60 Hz, but higher than 960 Hz to ensure sufficient accuracy) and converted from analog to discrete digital signals at a 20-bit high resolution by sample/hold & A/D conversion sub-system 107. The voltage signals are also used by the frequency measurement circuit 108 to measure the fundamental frequency of the voltage using known methods.

For example, the frequency may be measured in the frequency measurement circuit 108 by first filtering the input voltage signal using an analog bandpass or lowpass filter. The cutoff frequency could be set equal to the fundamental frequency of the voltage signal to filter out noises and harmonics. The sinusoidal output signal of the filter is then converted into a square waveform and the width of the square waveform is measured by a high frequency pulse using a digital counter and read into the DSP sub-system 109. The fundamental period T (=1/f) can be computed from the number of pulses counted in one cycle and the pulse length of the high frequency pulse. The measured frequency is then used for frequency related protection functions, such as over-frequency and under-frequency protection, and may also be used in accordance with the invention to compensate nonlinear frequency response characteristics of the voltage sensors 106.

Voltage sensors 106 may have a nonlinear voltage transfer ratio over the desired frequency range, which causes additional errors in the V/Hz relay determination. Accordingly, the ratio-frequency characteristic of a particular voltage sensor 106 can be measured and stored in the relay in accordance with the invention for correcting the errors caused by the voltage sensors 106.

The digitized and sampled data are processed in Digital Signal Processor (DSP) sub-system 109 to generate DFT phasors, RMS values, V/Hz values, and the like of the sampled signals for use by different protection functions implemented in software on Central Processing Unit (CPU) sub-system 110. The CPU sub-system 110 further interfaces with a front panel controller 111 to display data and waveforms on LED and LCD display 112 and to read data from keyboard 113 and with communication channels 114 to communicate with local and remote computers for data exchange. The CPU sub-system 110 may also interface with output contacts 115 to send out alarm signals and trip signals to trip breakers such as breakers 103 and 104 and with input contacts 116 to obtain additional information used by some protection functions of the CPU sub-system 110. All components of GPU 100 receive their power supply from power supply 117.

The software of GPU 100 is divided into three parts: one for the DSP sub-system 109, one for the CPU sub-system 110, and one for the front panel controller 111. Since the software for the front panel controller 111 performs conventional functions such as inputting settings, displaying results, and the like, it will not be described in detail. The functioning of the portions of the DSP software and CPU software related to the V/Hz relaying function will now be described with respect to FIGS. 4 and 5.

The DSP software implemented on DSP sub-system 109 controls sample/hold & A/D conversion circuit 107 and processes the sampled data to generate DFT phasors, RMS values, V/Hz values, and the like for use by the protection functions of the CPU sub-system 110. In accordance with the invention, the processing of the sampled data is performed each time that new samples of current and voltage are obtained during each sampling interval.

Figure 4A:
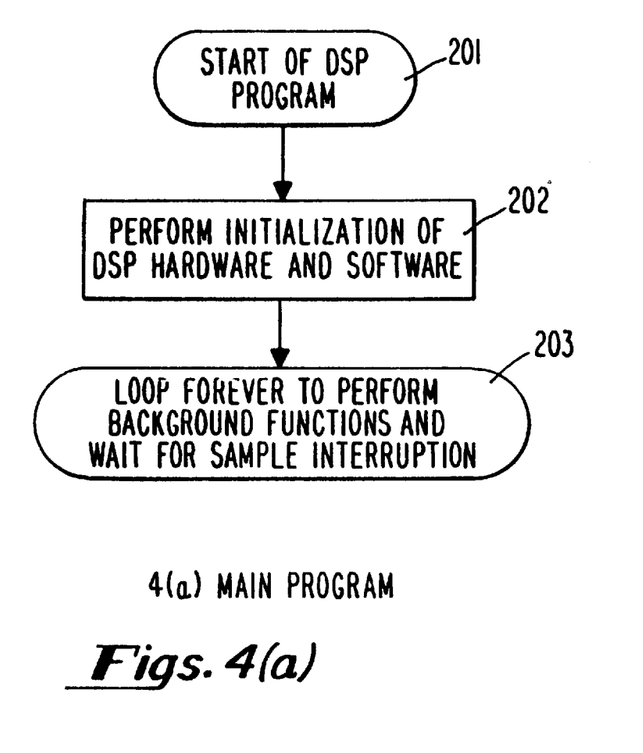
FIGS. 4A and 4B respectively illustrate the main and sample interrupt software routines implemented on a processor of the DSP sub-system 109.
Figure 4B:
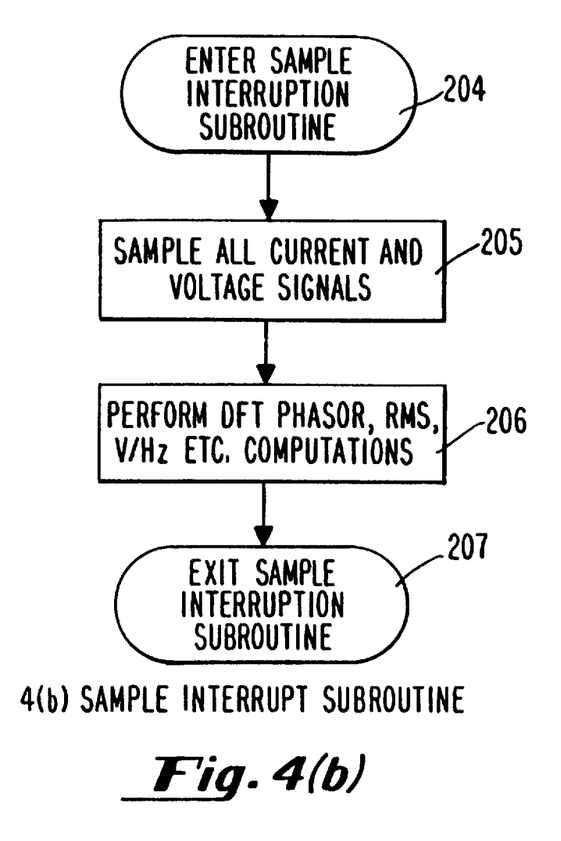
Figure 4C:
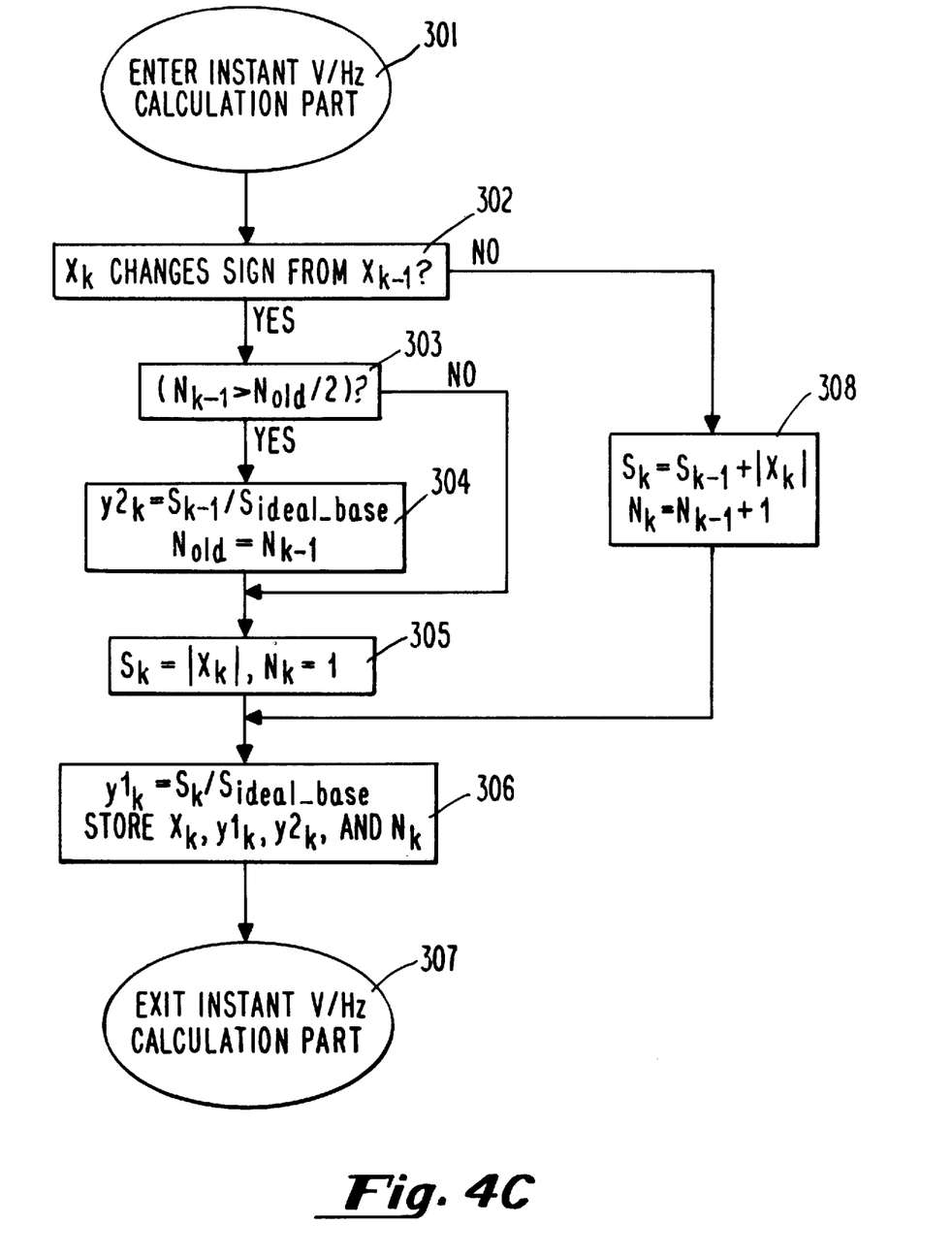
FIG. 4C is a flow chart illustrating the V/Hz value computation by the DSP software in accordance with the techniques of the invention.

FIGS. 4A and 4B show the overall DSP sub-system software flow chart, while FIG. 4C shows the flow chart related to V/Hz value computation in step 206 of the DSP software shown in FIG. 4B. As illustrated in FIG. 4A, the DSP program starts at step 201 and performs initializations of the DSP hardware of DSP sub-system 109 and the DSP software on a processor of DSP sub-system 109 at step 202. The main program of FIG. 4A loops forever at step 203 to perform the background functions until a sample interrupt is received. Then, when a sample interrupt is received, the subroutine of FIG. 4B is entered at step 204. Upon entry of the sample interruption subroutine, the current and voltage signals from current sensors 105 and voltage sensors 106 are sampled by sample/hold & A/D conversion circuit 107 at step 205. The DFT phasors, RMS values, V/Hz computations and the like are then performed at step 206 before the sample interruption subroutine is exited at step 207. The computation of the DFT phasor and the RMS values do not form part of the invention and may be computed using conventional DFT techniques. Calculation of the V/Hz values in accordance with a preferred embodiment of the invention will now be described with respect to FIG. 4C.

The computation of the V/Hz ratio in accordance with the HCS technique of the invention is done at every time step. As shown in FIG. 4C, the V/Hz value computation is performed in the DSP software by entering the V/Hz calculation program at step 301 each time a new sample is obtained. After reading in the input voltage data $x_k$, the program then always checks at step 302 to see if there is any sign change between the current sample $x_k$ and the previous sample $x_{k-1}$, for each sign change indicates that the voltage signal has crossed a zero between the two samples. Each sign change marks the end of the current summation and the start of the next summation of the digitized voltage signal in accordance with the HCS technique of the invention. At step 302, the sign change is determined by multiplying the new sample $x_k$ with the previous time step's sample $x_{k-1}$. If the result is less than or equal to zero, a sign change is detected. If the result is greater than zero, it means that there is no sign change for the new sample $x_k$.

If a sign change is not detected at step 302, the absolute value of the new sample $x_k$ will be added to the summation result $S_{k-1}$ of the previous time step at step 308 to yield the summation result $S_k$, and the counter value $N_k$ which counts the number of samples in the current half-cycle having been added to the sum $S_k$ is incremented by one. When there is no sign change detected at step 302, $S_k$ represents the partial sum result of the samples $x_k$ obtained so far in a half cycle. This makes $y1_k$ computed at step 306 a continuous signal, which will allow for a fast response of the instant V/Hz function, since it operates whenever $y1_k$ exceeds a predetermined level.

On the other hand, if a sign change is detected at step 302, the number $N_{k-1}$ of samples of the new sum is compared at step 303 to the number $N_{old}$ of samples of the previous valid sum. If $N_{k-1}$ is much less than the number of samples in the previous sum, say $N_{old}/2$, the sum $N_{k-1}$ is considered to be invalid and will not be used for further processing. This is to avoid invalid summation results caused by the multiple zero-crossing which may occur when the fundamental sinusoidal waveform is passing through zero multiple times due to noise and harmonics, thereby preventing the further processing of such erroneous data. If a sum $S_{k-1}$ is determined at step 303 to be valid, then $S_{k-1}$ is divided by $S_{idealbase}$ to obtain the new per unit V/Hz value, $y2_k$, at step 304. The number of samples $N_{k-1}$ of this sum $S_{k-1}$ is saved for use as $N_{old}$ in the next sum comparison (step 303), and the sample counter is reset to 1 at step 305. The absolute value of the new sample $x_k$ is used at step 305 as the initial value of the next sum $S_k$ for computing $y1_k$. In the case of an invalid sum at step 303, the new sum and the number of samples in the sum will be discarded. Then, at step 305, the sample counter $N_k$ is reset to 1, and the absolute value of the new sample $x_k$ is used as the initial value of the next sum $S_k$ for computing $y1_k$.

At step 306, a new $y1_k$ is calculated from the current summation data $S_k$ divided by the ideal base summation value, $S_{idealbase}$, and stored with the values of $x_k$, $y2_k$, and $N_k$. As desired, the resulting values for $x_k$ and $y2_k$ and $y1_k$ may be used for frequency correction for the voltage sensors 106 in the GPU 100 software. The V/Hz calculation program is then exited at step 307.

Those skilled in the art will appreciate that since the $S_{idealbase}$ value needs to be recomputed and error may increase during the transition period as a result of a change in sampling frequency that it is preferred for the sampling frequency to remain fixed. However, a variable sampling frequency may also be used so long as the minimum sampling frequency is sufficiently high and the $S_{idealbase}$ is updated whenever $f_{smp}$ is changed.

Figure 4D:
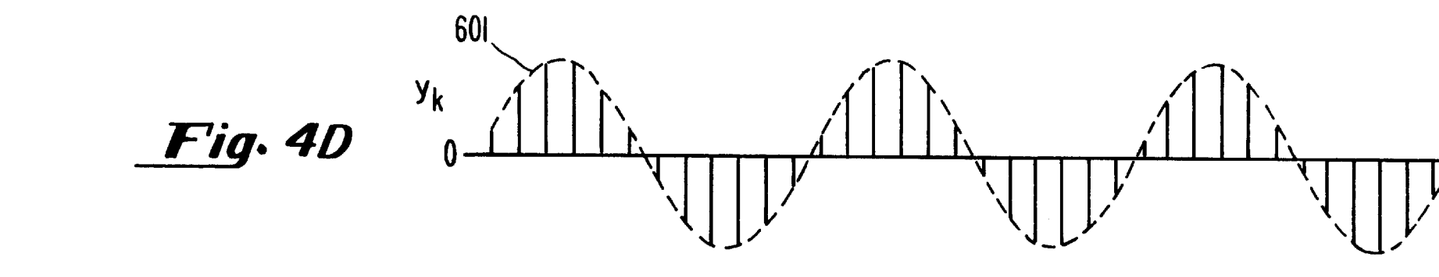
FIGS. 4D–4F illustrate the signals generated at different stages of the half-cycle summation technique for determining the V/Hz value in accordance with the invention.
Figure 4E:
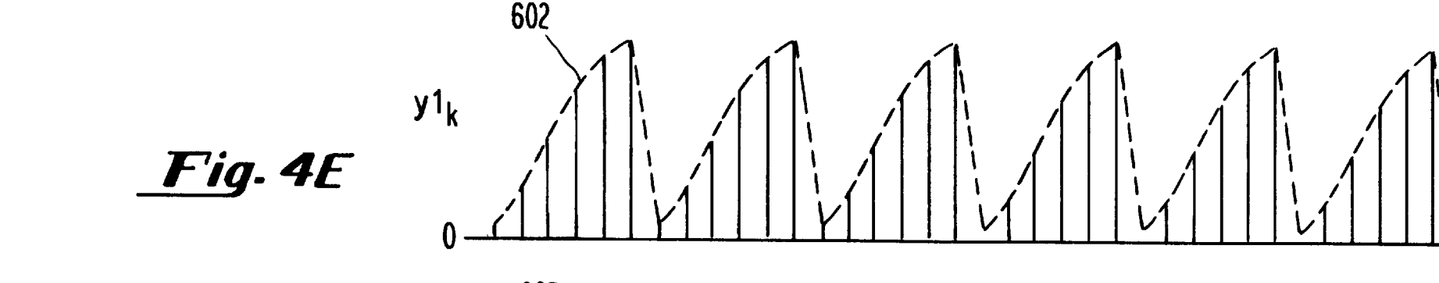
Figure 4F:
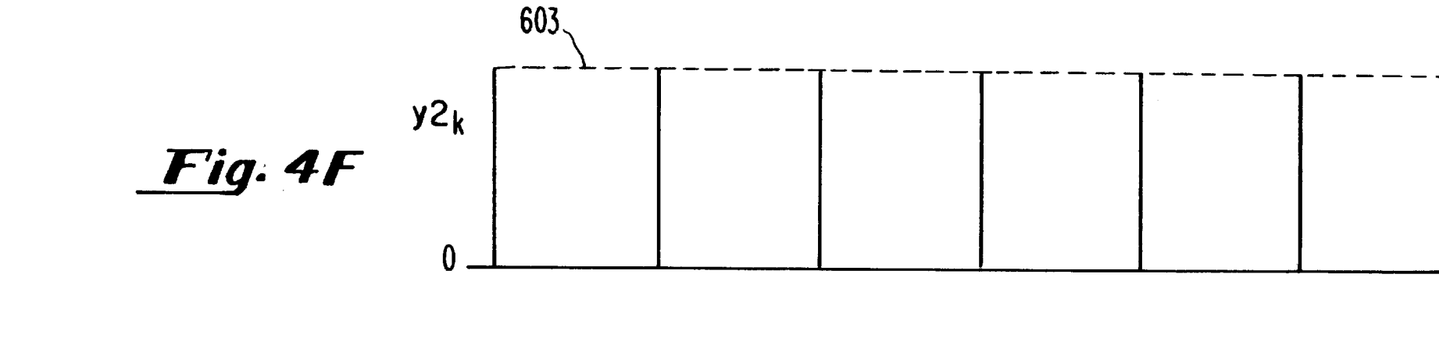

FIGS. 4D–4F show the signal waveforms of $x_k$, $y1_k$, and $y2_k$, respectively, as stored at step 306. Signal 601 is the sampled input voltage signal, $x_k$, added to the running half cycle summation at step 308 of FIG. 4C. Signal 602 is the per unit running sum $y1_k$ of the half cycle summation, while signal 603 is the V/Hz value $y2_k$ computed from the half-cycle summation value of signal 602 in step 304. As will be described below, signal 602 is then used in step 503 of FIG. 5C for instant trip determination and signal 603 is used in step 505 of FIG. 5C for computing the time-to-trip if it exceeds the pick-up level.

The CPU software, on the other hand, controls the communication channels 114 and output contacts 115, reads the status of the input contacts 116, performs all designed protection functions for the generator/transformer set 101, and, at the same time, the CPU software interfaces with the front panel controller 111 to read data from the keyboard 113 and to display data and waveforms on the front panel's LEDs and LCDs. A simplified flow chart of the CPU sub-system software is shown in FIG. 5A and 5B, and the related flow chart for the V/Hz relay function (block 405 in FIG. 5B) is shown in FIG. 5C.

Figure 5A:
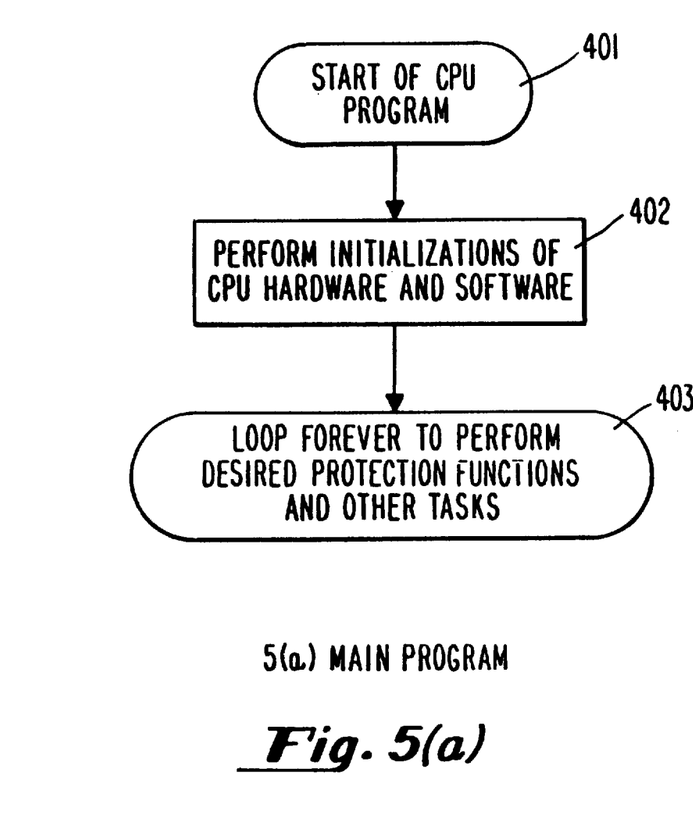
FIGS. 5A and 5B respectively illustrate the main and sample interrupt software routines implemented on a processor of the CPU sub-system 110.

As illustrated in FIG. 5A, the CPU program starts at step 401 and performs initializations of the CPU hardware of CPU sub-system 110 and the CPU software on a processor of CPU sub-system 110 at step 402. The main program of FIG. 5A loops forever to perform designated protection functions as well as other tasks. When a protection function is to be performed, the protective function subroutine of FIG. 5B is entered at step 404. The V/Hz relay functions are performed at step 405 in a conventional manner in dependence upon the V/Hz values calculated in the DSP sub-system software (FIG. 4C). For example, a "trip" signal may be sent to breakers 103 and/or 104 if an overexcitation condition is detected. Other generator/transformer set 101 protection functions are then performed at step 406 before the protection function subroutine is exited at step 407.

Figure 5B:
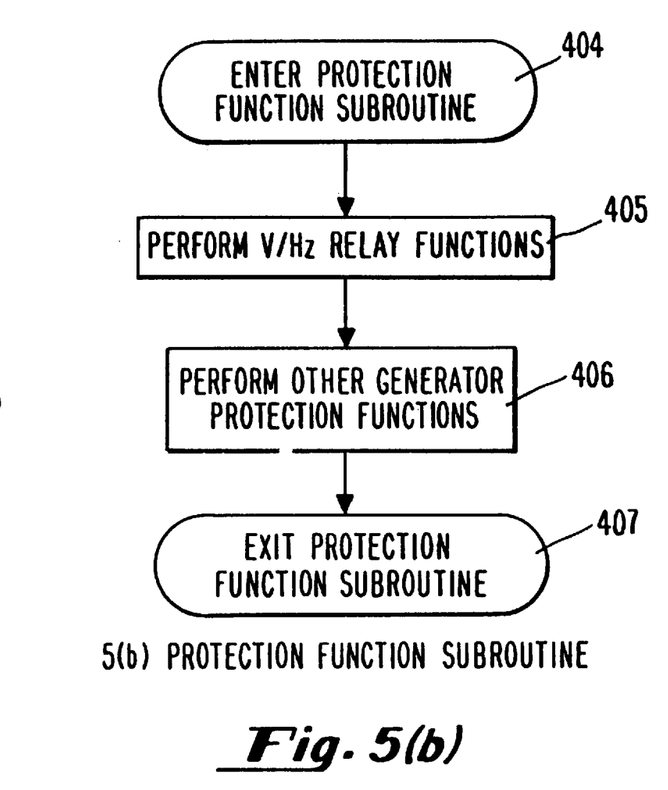
Figure 5C:
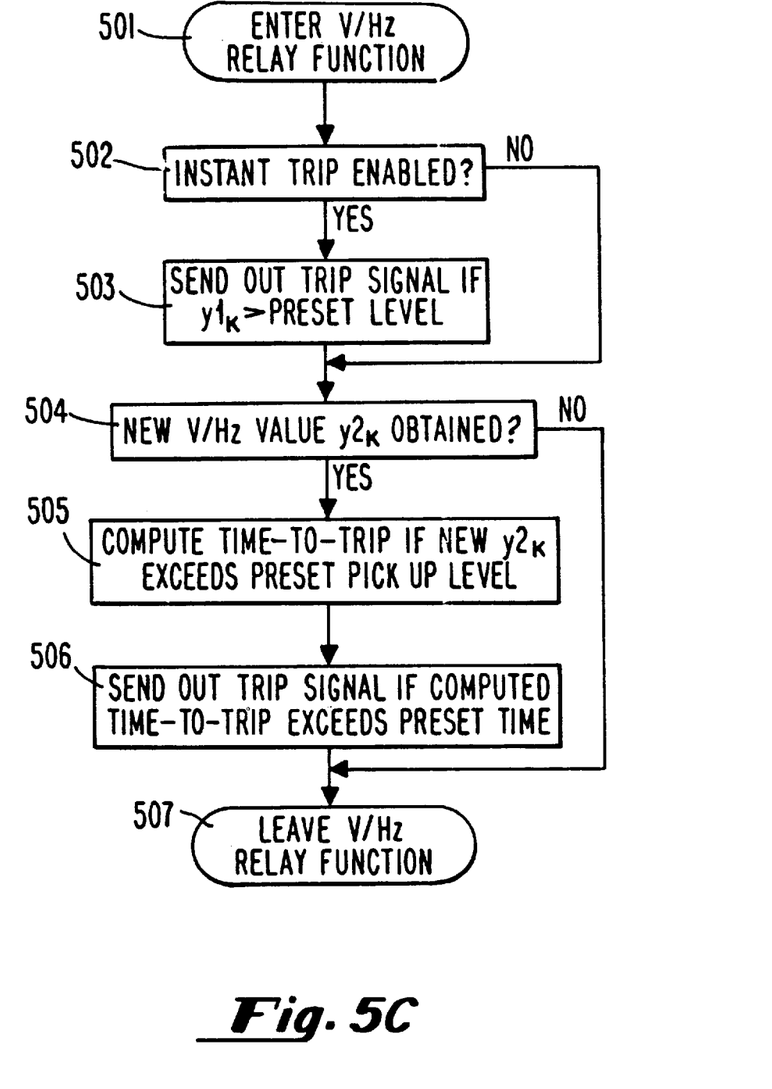
FIG. 5C is a flow chart illustrating the instant trip and delayed trip time calculations using the V/Hz values calculated in accordance with the techniques of the invention.

Each time the protection function subroutine of FIG. 5B is executed, the V/Hz relay function of step 405 is entered at step 501 (FIG. 5C) to check to see if the instant $y1_k$ value from the DSP sub-system 109 (signal 602 of FIG. 4E) exceeds the preset instant trip level when the instant trip of V/Hz is enabled (blocks 502 and 503 of FIG. 5C). A trip signal will be generated at step 503 immediately if the present level is exceeded. For a V/Hz relay delayed trip function, on the other hand, the system operates according to the selected generator/transformer capability curve in accordance with known techniques. In other words, if it is determined at step 504 that a new V/Hz value $y2_k$ is obtained (signal 603 of FIG. 4F), then the time-to-trip (either fixed or inverse time delay) is computed at step 505 when the new $y2_k$ value exceeds the preset pick up level. If the pick up level is exceeded, the inverse time trip signal is then sent out at step 506 at the end of the time delay. The time to trip is then reset based on the cooling factor $\Delta T$ for the generator/transformer set 101, and the V/Hz relay function is exited at step 507.

As noted above, the present invention is primarily directed to a new method of implementing accurate V/Hz value measurement and trip time determination for generator/transformer overexcitation protection in a manner which is independent of the conventional frequency tracking and phasor estimation based on Discrete Fourier Transformation (DFT) techniques in a multi-function GPU 100 of the type described above with respect to FIGS. 3–5. The present invention uses the same sampled data as are used by the DFT technique for other functions, but does not use any phasor estimation results of the DFT technique. Instead, the V/Hz ratio is computed directly from the sampled voltage data using the techniques described below. The result is overall better performance for the digital GPU system.

In particular, the V/Hz ratio is computed in accordance with the invention by a half cycle summation algorithm implemented in the DSP software (FIG. 4C) of DSP sub-system 109 in place of the conventional algorithm for tracking the frequency and estimating the voltage phasors. The technique of the invention avoids the computation of voltage magnitude and obtains an accurate per unit V/Hz ratio directly from the sampled voltage data.

The digital Half-Cycle Summation (HCS) technique of the invention is based on the fact that the half cycle summation of the absolute value of data samples of a sinusoidal signal $x = A \sin(2\pi ft)$ sampled at a frequency $f_{smp}$ approximates an ideal sum value $S_{ideal}$:

$$S = \sum_{n=1}^{N} |X_n| \approx \frac{f_{smp}}{\pi} \cdot \frac{A}{f} = S_{ideal} \qquad \text{Equation (4)}$$

where $X_n$ (n=1, ... N) are data samples in one half cycle of the digital voltage signal, A is an amplitude of the digital voltage signal, f is the frequency of the digital voltage signal, $T = 1/f$, and $f_{smp}$ is the sampling frequency. As will be shown below, the relative error of S, i.e. $|S - S_{ideal}|/S_{ideal}$, becomes smaller when $f_{smp}/f$ is higher. As can be seen from Equation (4), the ideal half cycle summation value of a sinusoidal signal has a perfect V/Hz characteristic.

The accurate per unit V/Hz value in accordance with the invention is approximated directly by dividing the summation result S of Equation (4) of the sinusoidal input signal $a = A\sin(2\pi ft)$ by a base ideal sum value $S_{idealbase}$ at the rated voltage and frequency:

$$S_{idealbase} = \frac{f_{smp}}{\pi} \cdot \frac{A_{rated}}{f_{rated}}$$

which is very easy to perform in a digital system while not in an analog system. That is:

$$S_{pu} = \frac{S}{S_{idealbase}} \approx \frac{S_{ideal}}{S_{idealbase}} = \frac{A/f}{A_{rated}/f_{rated}}$$

where $A_{rated}$ is the rated voltage magnitude and $f_{rated}$ is the nominal frequency of the digital voltage signal. Thus, for a sufficiently high sampling frequency $f_{smp}$, this equation leads to the accurate per unit V/Hz value of a sinusoidal voltage signal.

The following terms are used to derive equations for error analysis of the approximated results of an HCS technique in accordance with the invention:

$f_{smp}$ is the sampling frequency of the voltage signal;

f is the fundamental frequency of the voltage signal;

$N_f = f_{smp}/f$, which equals a non-integer number of samples per cycle;

$N_h = N_f/2$, which equals a non-integer number of samples per half cycle;

N is an integer satisfying the relation of $N - 1 \leq N_h < N$;

$\alpha = \pi/N_h$, which is the angle difference between two samples; and $\beta$ is the initial angle of the first sample ($0 \leq \beta < \alpha$) in one half cycle.

Depending upon the initial angle $\beta$ of the first sample, the half cycle summation of a digital voltage signal may contain N+1 sampled data or N sampled data. Thus, the summation could be:

$$S = S_1 = \sum_{n=0}^{N} A\sin(n\alpha + \beta) \text{ when } (0 \leq \beta < \pi - (N-1)\alpha) \quad \text{Equation (5)}$$

or $$S = S_2 = \sum_{n=0}^{N-1} A\sin(n\alpha + \beta) \text{ when } (\pi - (N-1)\alpha \leq \beta < \alpha) \quad \text{Equation (6)}$$

$S_1$ and $S_2$ can be simplified as:

$$S_1 = A \frac{\sin\left(\frac{N+1}{2}\alpha\right)\sin\left(\frac{N}{2}\alpha + \beta\right)}{\sin\left(\frac{\alpha}{2}\right)} = \qquad \text{Equation (7)}$$

$$A \frac{\sin\left(\frac{N+1}{2N_h}\pi\right)\sin\left(\frac{N\pi}{2N_h} + \beta\right)}{\sin\left(\frac{\pi}{2N_h}\right)}$$

$$S_2 = A \frac{\sin\left(\frac{N}{2}\alpha\right)\sin\left(\frac{N-1}{2}\alpha + \beta\right)}{\sin\left(\frac{\alpha}{2}\right)} = \qquad \text{Equation (8)}$$

$$A \frac{\sin\left(\frac{N\pi}{2N_h}\right)\sin\left(\frac{N-1}{2N_h}\pi + \beta\right)}{\sin\left(\frac{\pi}{2N_h}\right)}$$

When $N_h$ is large enough, the following approximation exists:

$$\sin\left(\frac{N+1}{2N_h}\pi\right) \approx \sin\left(\frac{N\pi}{2N_h} + \beta\right) \approx 1$$

$$\sin\left(\frac{N\pi}{2N_h}\right) \approx \sin\left(\frac{N-1}{2N_h}\pi + \beta\right) \approx 1$$

$$\sin\left(\frac{\pi}{2N_h}\right) \approx \frac{\pi}{2N_h}$$

Thus, $S_1$ and $S_2$ are approximately equal to:

$$S_1, S_2 \approx A \frac{1}{\pi/(2N_h)} = \frac{2AN_h}{\pi} = \frac{2AF_{smp}}{2\pi f} = \frac{f_{smp}}{\pi} \times \frac{A}{f} = S_{ideal} \quad \text{Equation (9)}$$

When $f_{smp}$ is fixed, the above equation means that $S_1$ (or $S_2$) is directly proportional to the magnitude "A" of the input voltage signal and inversely proportional to the frequency "f" of the input voltage signal.

Thus, the accurate per unit V/Hz value can be approximated by a digital half cycle summation of the sampled data divided by the base ideal sum $S_{idealbase}$ at the rated voltage and frequency, which is very easy to perform in a digital system while not in an analog system. That is:

$$S_{pu} = \frac{S}{S_{idealbase}} \approx \frac{S_{ideal}}{S_{idealbase}} = \frac{A/f}{A_{rated}/f_{rated}} \qquad \text{Equation (10)}$$

where $A_{rated}$ is the rated voltage magnitude and $f_{rated}$ is the nominal frequency of the digital voltage signal.

For a pure sinusoidal voltage signal, the errors between $S_1$ (or $S_2$) and $S_{ideal}$ are determined by the sampling frequency "$f_{smp}$", the ratio of the sampling frequency "$f_{smp}$" over the voltage signal's frequency "f" and the initial angle "$\beta$". Those skilled in the art will appreciate that the larger the $N_h$, the more accurate the result. At given $f_{smp}$ and $N_h$, the errors of $S_1$ and $S_2$ are a function of $\beta$. The maximum and minimum values of $S_1$ and $S_2$ in the $\beta$ value range can be obtained as follows:

$$S_{1\_max} = A \frac{\sin\left(\frac{N+1}{2N_h}\pi\right)}{\sin\left(\frac{\pi}{2N_h}\right)} \text{ and} \qquad \text{Equation (11)}$$

-continued $$S_{1\_min} = S_{1\_max} \times \sin\left(\frac{N\pi}{2N_h}\right)$$

$$S_{2\_max} = A \frac{\sin\left(\frac{N\pi}{2N_h}\right)}{\sin\left(\frac{\pi}{2N_h}\right)} \text{ and}$$

Equation (12)

$$S_{2\_min} = S_{2\_max} \times \sin\left(\frac{N+1}{2N_h}\pi\right)$$

Thus, $S_{1\text{-}min} = S_{2\text{-}min}$. Accordingly, the maximum and minimum values of S are determined by:

$$S_{max} = \max[A \frac{\sin\left(\frac{(N+1)\pi}{2N_h}\right)}{\sin\left(\frac{\pi}{2N_h}\right)}, A \frac{\sin\left(N\frac{\pi}{2N_h}\right)}{\sin\left(\frac{\pi}{2N_h}\right)}]$$

Equation (13)

and $$S_{min} = A \frac{\sin\left(\frac{N+1}{2N_h}\pi\right)\sin\left(\frac{N\pi}{2N_h}\right)}{\sin\left(\frac{\pi}{2N_h}\right)}$$

Equation (14)

When $N_h$ is high, we have:

$$\sin\left(\frac{(N+1)\pi}{2N_h}\right) \approx \sin\left(\frac{N\pi}{2N_h}\right) \approx 1 \text{ and}$$

$$\sin\left(\frac{\pi}{2N_h}\right) \approx \frac{\pi}{2N_h}$$

Equation (15)

Equation 15 leads to:

$$S_{max} \approx S_{min} \approx \frac{A}{\left(\frac{\pi}{2N_h}\right)} = f_{smp}\frac{A}{\pi f} = S_{ideal}$$

Equation (16)

Equation 15 indicates that the higher the sampling frequency, the higher the $N_h$, and the closer the digital half cycle summation is to the ideal V/Hz characteristic. Its error is mainly determined by the sampling frequency but also varies with the frequency of the input signal when the sampling frequency is fixed. If $f_{smp}$ is varied to keep $f_{smp}/f$ (i.e., $N_h$) constant, the sum S will fall in between $S_{min}$ and $S_{max}$ across the frequency range in which $f_{smp}$ is varying.

Figure 6:
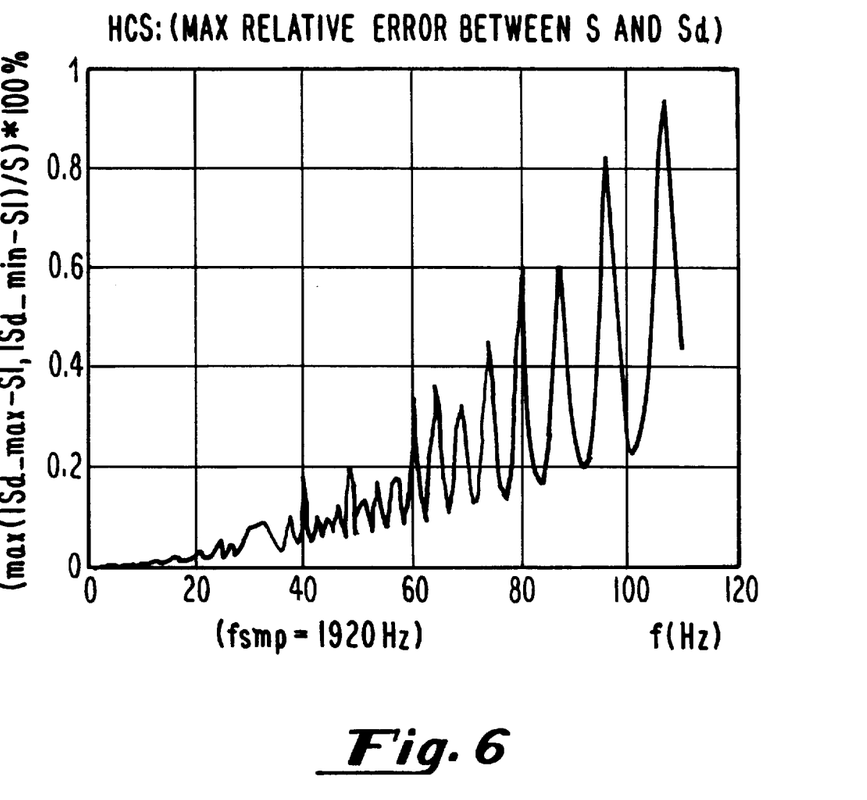
FIG. 6 is a chart illustrating that the maximum relative error which occurs at a sampling frequency of 1920 Hz in accordance with the invention is less than 0.6%.

FIG. 6 shows the relative error between $S_{max}$, $S_{min}$ and $S_{ideal}$ when $f_{smp}$ is fixed at 1920 Hz. As FIG. 6 shows, at a sampling frequency of 1920 Hz the maximum relative errors across the desired frequency range (5–80 Hz) of a half cycle summation V/Hz relay is less than 0.6%. Moreover, unlike the other algorithms where the errors are large at the low frequency end, the errors in the half cycle summation technique in accordance with the invention become smaller at the low frequency end. Considering the fact that the high V/Hz phenomenon is much likely to occur at the lower frequency end and not at the higher frequency end, this is an advantage of the half cycle summation technique of the invention. Another major advantage of half cycle summation technique of the invention is that it is a non-recursive type filter and is always stable, with no time delay in responding to the sudden change of input signal.

Other major advantages of using a digital HCS technique for V/Hz relaying in accordance with the invention are that: (1) frequency estimation techniques are not necessary as in a DFT based approach; (2) high accuracy may be obtained across the whole V/Hz relaying frequency range (5–80 Hz), particularly at the low frequency end where high V/Hz is more likely to occur; (3) it can be implemented both for fixed and varying sampling frequency digital protection systems, although the invention is best utilized in a fixed sampling frequency system; and (4) it is easy to design and implement in a digital protection system and avoids the need for more complicated integration methods of the type taught by Verbanets, Jr., for example. Also, a peak detector is not necessary. However, since the technique of the invention requires determination of the half cycle of the input voltage signal, a zero crossing detector is required to detect the zero crossing at the half cycle.

The technique of the invention thus provides for improved V/Hz relaying using digital techniques in an otherwise DFT based multi-function relay system. In other words, the present inventors recognize that the DFT technique may be suitable for most of the generator protection functions when a variable sampling frequency technique plus fixed DFT window technique is used or a fixed sampling frequency technique plus varying DFT window technique is applied, for most of generator protection functions are only required to operate around the rated frequency (60 Hz in North America). For both techniques, their covered frequency range is determined by the anti-aliasing limitation at the low frequency end and the computation power limitation at the high frequency end. Unlike in a stand-alone protection system where the system hardware and the software can be designed to meet the specific requirement of a particular function, the sampling frequency approach and/or DFT window approach (either varying or fixed) used in such a system is usually determined by the overall system requirement but not an individual function. However, since the frequency range provided by the DFT technique does not meet the V/Hz relay's requirement, the present invention is very useful in providing adequate V/Hz relaying in a DFT technique based multi-function generator protection system.

Thus, the present invention recognizes that the summation S of the absolute value of the samples in one half cycle of a sinusoidal voltage waveform yields a result:

$$S \approx \frac{f_{smp}}{\pi} \times \frac{A}{f} = S_{ideal}$$

which is representative of the V/Hz value of the input voltage signal since both $f_{smp}$ and $\pi$ are known values. Thus, the relative error of the actual summation result S to the ideal value $S_{ideal}$ can be directly controlled by the sampling frequency $f_{smp}$. As noted above, a sampling frequency higher than 1920 Hz would give an acceptable relative error level with the maximum relative error being less than 0.6% in the desired V/Hz operating frequency range of 5–80 Hz. The HCS technique of the invention also has a desirable error characteristic in that the error becomes smaller towards the low frequency end where a high V/Hz is more likely to occur. The validity of the summation results is checked before a summation result is multiplied by the inverse of the $S_{idealbase}$. This ensures that only valid summation results are used for further processing and that no time delay is introduced into the process as when conventional filtering methods are used.

Although exemplary embodiments of the invention have been described in detail above, those skilled in the art will readily appreciate that many additional modifications are possible in the exemplary embodiment without materially departing from the novel teachings and advantages of the invention. For example, those skilled in the art will appreciate that the invention need not be limited to implementation in a fixed sampling frequency approach, but that it is possible to use HCS in a variable sampling frequency system. In such an embodiment, the ideal base value should be updated each time the sampling frequency is changed. Accordingly, all such modifications are intended to be included within the scope of this invention as defined in the following claims.

What we claim is:

1. A programmed protective relay system for protecting power equipment, supplied with energy from at least one power line, against overexcitation by generating an overexcitation relay signal and providing said relay signal to a circuit breaker which separates said power equipment from a source of said overexcitation, said system comprising:

voltage sensing means for sensing voltages of said at least one power line;

frequency determining means for determining a frequency of a sensed voltage signal of said at least one power line;

an analog to digital converter which samples said sensed voltage signal at a sampling frequency so as to form a digital voltage signal;

summing means for summing said digital voltage signal over a half cycle of said sensed voltage signal and dividing the sum by a base ideal sum value at a rated voltage and frequency to obtain a value for a voltage/frequency ratio of said at least one power line; and generating means for generating said relay signal when said voltage/frequency ratio exceeds a predetermined value.

2. A system as in claim 1, wherein said summing means generates a sum S of absolute values of data samples of a sensed voltage signal x=A sin(2πft) sampled at a frequency $f_{smp}$, approximating an ideal sum value $S_{ideal}$, where:

$$S = \sum_{n=1}^{N} |X_n| \approx \frac{f_{smp}}{\pi} \cdot \frac{A}{f} = S_{ideal}$$

where $X_n$ (n=1, ... N) are data samples in one half cycle of the digital voltage signal, A is an amplitude of the digital voltage signal, and f is the frequency of the digital voltage signal.

3. A system as in claim 2, wherein said summing means comprises means for determining whether a received voltage sample $x_k$, has changed in sign from a previously received voltage sample $x_{k-1}$, and if no change in sign is detected, for summing said received voltage sample $x_k$ with a previous sum $S_{k-1}$ of all previously received voltage samples $x_1$ through $x_{k-1}$ of the present half cycle of said sensed voltage signal to yield an updated sum $S_k$.

4. A system as in claim 3, wherein said summing means comprises means responsive to said sign changing means for determining, when a sign change is detected, whether a number of samples $N_{k-1}$ in a just completed half cycle of said sensed voltage signal is approximate to a number of samples $N_{old}$ in a previous half cycle of said sensed voltage signal and for discarding the sensed voltage samples in the just completed half cycle of said sensed voltage signal prior to further processing by said generating means when it is determined that the number of samples $N_{k-1}$ in the just completed half cycle of said sensed voltage signal is not approximate to said number of samples $N_{old}$ in said previous half cycle of said sensed voltage signal.

5. A system as in claim 2, wherein said sampling frequency is fixed at a value which is at least 960 Hz.

6. A system as in claim 5, wherein said sampling frequency is fixed at a value which is approximately equal to 1920 Hz.

7. A system as in claim 2, wherein said sampling frequency is variable and the base ideal sum value at the rated voltage and frequency is updated for the new sampling frequency when the sampling frequency is changed.

8. A system as in claim 1, further comprising means for storing a ratio-frequency characteristic of said voltage sensing means for correcting non-linear frequency response characteristics of said voltage sensing means.

9. A method of protecting power equipment, supplied with energy from at least one power line, against overexcitation, comprising the steps of:

sensing voltages of said at least one power line;

determining a frequency of a sensed voltage signal of said at least one power line;

sampling and digitizing said sensed voltage signal at a sampling frequency so as to form a digital voltage signal;

summing said digital voltage signal over a half cycle of said sensed voltage signal;

dividing the half cycle sum of said digital voltage signal by a base ideal sum value at a rated voltage and frequency to obtain a value for a voltage/frequency ratio of said at least one power line;

generating an overexcitation relay signal when said voltage/frequency ratio exceeds a predetermined value; and providing said relay signal to a circuit breaker which separates said power equipment from a source of said overexcitation.

10. A method as in claim 9, wherein said summing step comprises the step of generating a sum S of absolute values of data samples of a sensed voltage signal x=A sin(2πft) sampled at a frequency $f_{smp}$, approximating an ideal sum value $S_{ideal}$, where:

$$S = \sum_{n=1}^{N} |X_n| \approx \frac{f_{smp}}{\pi} \cdot \frac{A}{f} = S_{ideal}$$

where $X_n$ (n=1, ... N) are data samples in one half cycle of the digital voltage signal, A is an amplitude of the digital voltage signal, and f is the frequency of the digital voltage signal.

11. A method as in claim 10, wherein said summing step comprises the steps of determining whether a received voltage sample $x_k$ has changed in sign from a previously received voltage sample $x_{k-1}$, and if no change in sign is detected, of summing said received voltage sample $x_k$ with a previous sum $S_{k-1}$ of all previously received voltage samples $x_1$ through $x_{k-1}$ of the present half cycle of said sensed voltage signal to yield an updated sum $S_k$.

12. A method as in claim 11, wherein said summing step further comprises the steps of determining, when a sign change is determined in said sign change determining step, whether a number of samples $N_{k-1}$ in a just completed half cycle of said sensed voltage signal is approximate to a number of samples $N_{old}$ in a previous half cycle of said sensed voltage signal, and for discarding the sensed voltage samples in the just completed half cycle of said sensed voltage signal prior to further processing in said generating step when it is determined that the number of samples $N_{k-1}$ in the just completed half cycle of said sensed voltage signal is not approximate to said number of samples $N_{old}$ in said previous half cycle of said sensed voltage signal.

13. A method as in claim 10, wherein said sampling and digitizing step comprises the step of sampling said sensed voltage at a sampling frequency which is fixed at a value which is at least 960 Hz.

14. A method as in claim 13, wherein said sampling frequency is fixed at a value which is approximately equal to 1920 Hz.

15. A method as in claim 10, wherein said sampling and digitizing step comprises the step of sampling said sensed voltage at a variable sampling frequency and updating the base ideal sum value at the rated voltage and frequency for the new sampling frequency when the sampling frequency is changed.

16. A method as in claim 9, comprising the further step of storing a ratio-frequency characteristic of a voltage sensing means for correcting non-linear frequency response characteristics of said voltage sensing means.

\* \* \* \* \*